United States Patent
Daniele

(10) Patent No.: US 6,733,056 B2
(45) Date of Patent: May 11, 2004

(54) SCOOP UTENSIL

(75) Inventor: Pamela Daniele, Atlanta, GA (US)

(73) Assignee: Full Court Press, Inc., Atlanta, GA (US)

(*) Notice: Subject to any disclaimer, the term of this patent is extended or adjusted under 35 U.S.C. 154(b) by 57 days.

(21) Appl. No.: 10/172,442

(22) Filed: Jun. 14, 2002

(65) Prior Publication Data

US 2003/0230905 A1 Dec. 18, 2003

(51) Int. Cl.$^7$ ................................................. A47J 43/28
(52) U.S. Cl. ............................... 294/1.1; 294/55; 30/169
(58) Field of Search ........................... 294/1.1, 1.3, 3.5, 294/7, 25, 49, 54.5, 55, 57; 15/257.1, 257.9, 236.01, 236.02; 30/124, 136, 169, 324

(56) References Cited

U.S. PATENT DOCUMENTS

| | | | |
|---|---|---|---|
| 339,514 A | | 4/1886 | Averill |
| 421,995 A | | 2/1890 | Von Reibnitz |
| 969,528 A | * | 9/1910 | Disbrow ........................ 30/169 |
| D57,649 S | * | 4/1921 | Hines ........................... D32/74 |
| 1,704,329 A | | 3/1929 | Klaus |
| 2,243,236 A | | 9/1941 | Walsh ............................ 294/1 |
| 2,613,977 A | | 5/1952 | Kellogg ......................... 294/1 |
| 2,603,093 A | * | 7/1952 | Cordova ........................ 73/427 |
| 2,641,496 A | | 8/1953 | Benezet et al. ................. 294/1 |
| 2,651,925 A | * | 9/1953 | Lawrence ................... 15/257.1 |
| 3,800,352 A | | 4/1974 | Bonora ......................... 15/105 |
| 4,043,203 A | * | 8/1977 | Montesi ........................ 73/427 |
| 4,159,839 A | | 7/1979 | Sigler ............................. 294/1 |
| D256,173 S | * | 7/1980 | Rigney ....................... D30/162 |
| 4,229,880 A | | 10/1980 | Brooks et al. ................. 30/142 |
| 4,245,411 A | * | 1/1981 | McMath ........................ 37/265 |
| 5,201,121 A | * | 4/1993 | Heiberg ........................ 30/123 |
| 5,294,467 A | | 3/1994 | Hoodes ...................... 428/34.1 |
| 5,887,919 A | * | 3/1999 | Sallinen et al. ............. 294/54.5 |
| 6,249,930 B1 | * | 6/2001 | Noggle ....................... 15/257.1 |

* cited by examiner

*Primary Examiner*—Dean J. Kramer
(74) *Attorney, Agent, or Firm*—Womble Carlyle Sandridge & Rice, PLLC

(57) ABSTRACT

A scooping utensil is particularly useful in the kitchen for scooping up mounds of chopped and diced meats, veggies, cheeses, and the like. The utensil, preferably formed of injection molded plastic, has a pan bounded on two sides by upstanding walls and along its rear edge by a handle portion. The handle portion extends between the walls and is smoothly contoured and ergonomically shaped to fit comfortably in the hand of a chef for use. The forward edge of the pan is tapered to a relatively sharp edge. In use, a chef grasps the scooping utensil in one hand and slides the forward edge of the pan under a mound of chopped-up food to scoop the food into the pan. The utensil and scooped-up food is then carried to where it is needed, where the food is dumped off of the front edge of the utensil. The process is clean, efficient, and only requires one hand of the chef, which frees the other hand for stirring or other uses.

7 Claims, 2 Drawing Sheets

US 6,733,056 B2

SCOOP UTENSIL

TECHNICAL FIELD

This invention relates generally to hand tools and utensils and more specifically to a scoop utensil particularly useful in the kitchen for scooping up chopped vegetables, grated cheeses, and other foods during cooking.

BACKGROUND

Chefs have long used knives, graters, choppers and other cutting utensils in the kitchen for chopping, dicing, shredding, and grating foods for cooking. For example, vegetables such as onions, radishes, celery, lettuce, and the like often are chopped, diced, or shredded into small pieces for use in soups and salads. Graters often are used to create mounds of grated cheeses for pizzas, salads, and soups. Traditionally, when a mound of chopped or grated food is to be picked up and placed into a dish being prepared by a chef, the chef simply scoops up the mound between cupped hands, carries it to the dish under preparation, and dumps it in the dish. While this technique certainly is functional and has been used successfully for centuries, it nevertheless has various inherent shortcomings that render it less than optimum. For instance, in order that the hands can be used to scoop up food, all other utensils must be put down. In addition, the act of scooping up the food and carrying it across the kitchen to be placed in a pan, pot, or dish requires the full use of both hands, which therefore are not available for other activities. The very shape of the hands themselves renders them inefficient for scooping and, invariably, some of the chopped-up food being scooped is left behind to be scraped into a sink or otherwise discarded. Such clean up is a wasteful and time consuming task. The chef also must stop to wipe or clean his or her hands after having scooped up and dumped the chopped food, which takes even more time. Finally, the use of the hands in this way can be unsanitary if, for example, the hands are not properly cleaned or carry undesirable bacteria or other contaminates from other food, such as uncooked poultry, that has been handled by the chef.

Some chefs have been known to improvise in an attempt to improve upon the hand-scooping of chopped-up foods by using a cookie sheet, cutting board, dough cutter, or other flat utensil for scooping up food instead of scooping it up with the hands. While this can help, it nevertheless is an unsatisfactory solution because these utensils are not properly sized or shaped for the job, are awkward to handle in such a task, and/or tend to spill the chopped-up food over the sides of the utensil.

Accordingly, a persistent need exists for a utensil that can be used in the kitchen for scooping up mounds of chopped, shredded, and grated foods quickly and efficiently, carrying the food across the kitchen, and dumping it into a soup or other dish being prepared. Such a utensil should be simple and easy to manipulate by a chef without requiring the use of both hands. Further, it should be sanitary, should prevent the scooped-up food from being spilled while being moved, and should be attractive, compact, and economical to manufacture. It is to the provision of such a utensil that the present invention is primarily directed.

SUMMARY OF THE INVENTION

Briefly described, the present invention, in one preferred embodiment thereof, comprises a scoop utensil that is particularly useful in the kitchen for scooping up food such as chopped and shredded vegetables. The utensil, which preferably is unitarily formed from injection molded plastic or other appropriate material, has a pan that is formed with a flat floor bounded on either side by upstanding walls. The forward edge of the floor tapers to a relatively sharp edge for slipping easily under foods when scooping them up. The walls of the pan contain the food and prevent it from being spilled when being carried across the kitchen. At the back of the pan is formed an ergonomically shaped handle portion to provide a comfortable and convenient grip for a chef. The handle portion has a generally oval-shaped cross section and is rearwardly and gently curved or arched to fit comfortably in the hand. The handle portion also bounds the rear of the pan to prevent spillage of food in this direction from the pan.

In use, a chef simply grasps the scoop utensil by the handle portion and slides the tapered forward edge of the pan under a mound of food to be scooped up. Another utensil such as, for example, a knife, can be used if desired to help shovel the food into the pan. Once securely in the pan, the scoop utensil is simply tilted back slightly to prevent spillage over the front of the pan and the scooped-up food is carried to where it is needed, all requiring only one hand of the chef. Because of its shape and tapered forward edge, the scoop utensil of this invention is efficient, scooping up virtually all of a mound of chopped, shredded, or grated meats, veggies, cheese, or other foods with ease. Using the scoop utensil is substantially more sanitary than using the hands and will not transfer undesirable bacteria or other contaminants from the chef's hands to the scooped-up food.

It will thus be seen that a utensil is now provided that addresses and solves all of the shortcomings of traditional techniques and that is attractive, economical to manufacture, compact for easy storage, and efficient to use. The utensil of this invention also has many uses outside the kitchen, for example, as a digging tool in the garden, as a useful addition to a hiker's backpack, as a shop implement for collecting items such as sawdust or spilled nails, and even as a standard issue utility tool for military troops in the field. These and other features, objects, and advantages of the scoop utensil of this invention will become more apparent upon review of the detailed description set forth below when taken in conjunction with the accompanying drawings, which are briefly described as follows.

DETAILED DESCRIPTION OF THE PREFERRED EMBODIMENTS

Figure 1:
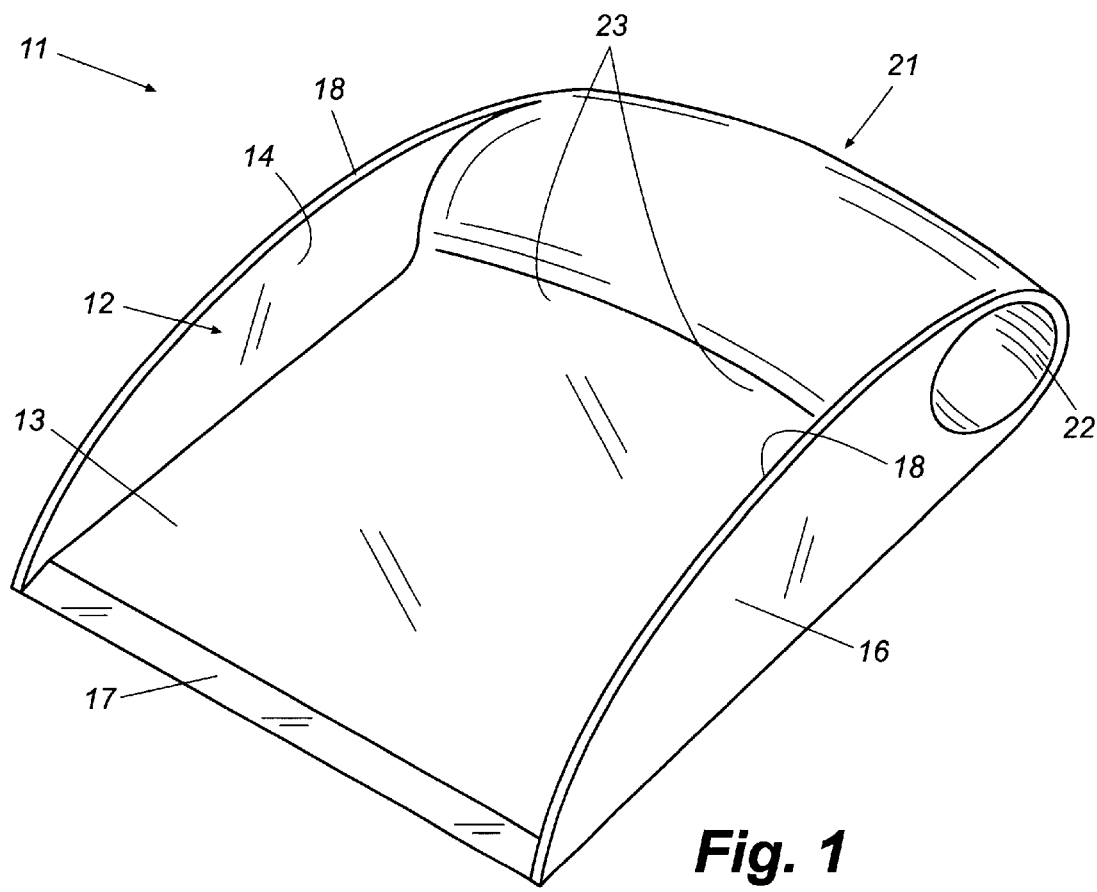
FIG. 1 is a perspective view of a scoop utensil that embodies principles of the present invention in a preferred form.
Figure 2:
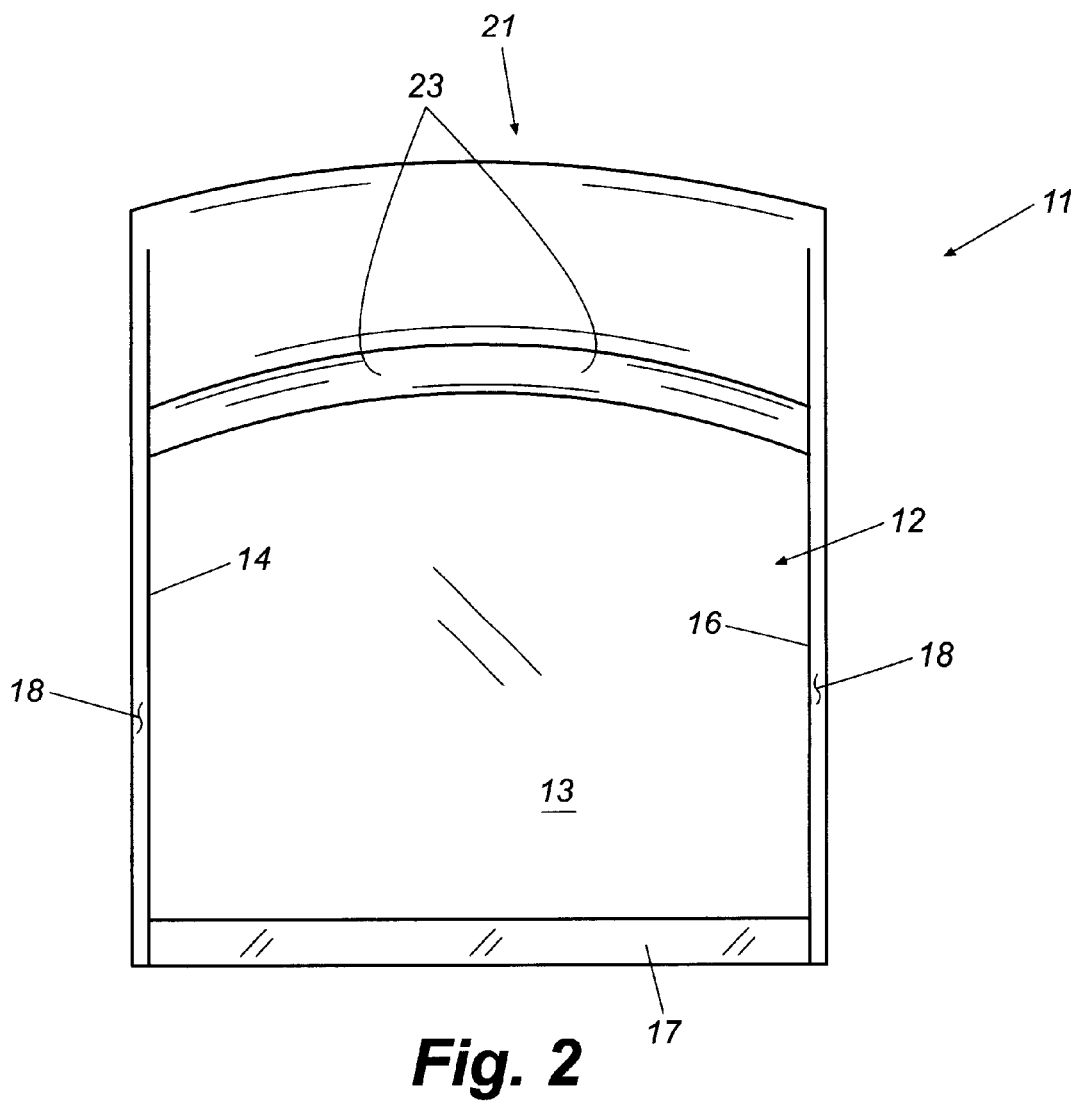
FIG. 2 is a top plan view of the scoop utensil of FIG. 1 illustrating the curved or arched ergonomic shape of its handle portion.
Figure 3:
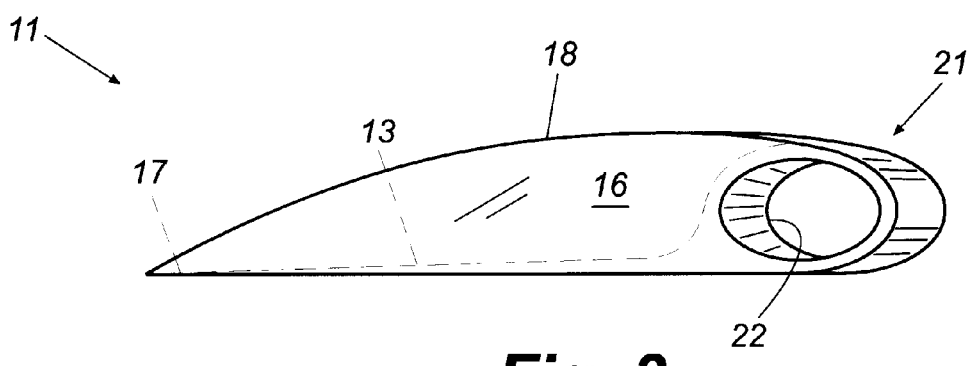
FIG. 3 is a side elevational view of the scoop utensil illustrating the hollow handle portion thereof.

Reference is now made in more detail to the drawing figures, which illustrate a preferred embodiment of the scoop utensil and represent the best mode known to the inventors of carrying out the invention. In the drawings, like reference numerals are used to refer to like parts of the utensil throughout the several views. The scoop utensil 11, which, as mentioned above, preferably is injection molded, is formed to define a pan 12 having a generally flat floor 13 that terminates in a tapered or sharpened forward edge portion 17. An upstanding left side wall 14 flanks the left side of the floor 13 and an upstanding right side wall 16 flanks the right side of the floor 13. The left side wall 14 and the right side walls 16 each is formed with an upper or top edge 18 that gently curves up and back from the forward end of the wall, as best seen in FIGS. 1 and 3. This particular shape for the side walls is preferred because it is functional and aesthetically pleasing. Preferably, the top edges 18 of the side walls are smoothly rounded for safety and a clean appearance. Further, the junction between each of the side walls and the floor 13 of the pan is formed with a smooth transition, again for a clean appearance and to inhibit the collection of food that otherwise might occur at a sharp corner transition. It will be understood by those of skill in the art, however, that a variety of other shapes also may be selected for the side walls depending upon application specific requirements. Accordingly the particular shape of the side walls in the preferred embodiment is not and should not be considered a limitation of the invention.

A ergonomically shaped handle portion 21 of the utensil 11 is formed along the back of the pan 12 to provide a comfortable and convenient grip for a chef while using the scoop utensil. As perhaps best illustrated in FIG. 3, the handle portion 21 has a generally oval-shaped tubular cross section and gently arches or curves rearwardly to fit comfortably in the hand of a chef. The floor 13 of the pan merges with the handle portion 21 along a smoothly contoured intersection 23. This provides for a visually pleasing contemporary design while at the same time eliminating abrupt corners or crevices in which food may become lodged during use of the utensil.

As mentioned above, the handle portion 21 is generally tubular in nature, having an arched oval passageway 22 that extends through the handle portion from one side of the utensil to the other. In practice, the wall thickness of the tubular handle portion is a bit thicker in the center of the handle than at its ends in order to facilitate the removal of plugs in the injection mold after the utensil has been formed. The left and right side walls 14 and 16 in the illustrated embodiment merge gracefully with the ends of the handle portion as best seen in FIGS. 1 and 3 to provide a pleasing appearance. The maximum height of the walls 14 and 15 preferably is slightly greater than the height of the handle portion 21 as shown in FIG. 3 to facilitate the graceful merging of the side walls with the handle portion. It will thus be seen that the handle portion 21 bounds the rear of the pan 12 to prevent spillage of food in this direction while the left and right side walls 14 and 16 bound respective sides of the pan 12. Food scooped up in the pan is thus contained and restrained from spilling out of the pan until it is intentionally dumped from the forward edge thereof.

The gracefully contoured oval shape of the handle portion 21 is considered by the inventors to be the best mode of carrying out the invention because it has proven to fit comfortably within the hand of a chef during use. Of course, other shapes of the handle portion may be selected depending upon the intended ultimate use of the utensil. For instance, if the utensil of this invention is intended to be applied to uses that require a firm non-slip grip such as, for example, for digging in a garden, then a handle portion formed with finger and thumb grooves or with friction enhancing protrusions might be selected. As with the shape of the walls 14 and 16, all such shapes of the handle portion are and should be considered to be within the scope of the invention.

The scoop utensil of this invention may be used by a chef in the kitchen as follows. After having chopped, diced, shredded, or otherwise cut up a mound of food such as meats, veggies, or cheese, the chef simply grasps the scoop utensil by its handle portion with the forward edge 17 of the pan facing inwardly away from the hand. The forward edge 17 is then slid under the mound of chopped food to move the food into the pan of the utensil. In this regard, the chef may use his or her free hand or another utensil such as a knife to help shovel the food into the pan. Once the mound of chopped food is scooped into the pan, it is contained by the side walls and handle portion of the utensil. The chef then simply lifts the forward edge of the utensil upwardly to prevent spillage from the front and carries the mound of food to where it is needed in a dish being prepared. The food is then dumped into the dish by tilting the forward edge of the utensil downwardly until the food slides out of the pan. Throughout this entire process, only one of the chef's hands is occupied, leaving the other hand free for stirring, moving pots, or any other needed activity. At the same time, the scoop utensil is very efficient in that it scoops up virtually the entire mound of chopped food leaving very little waste behind and does not allow the food to spill while being carried to another location in the kitchen. When not in use, the scoop utensil easily fits within a kitchen drawer for storage.

As previously mentioned, the scoop utensil of the present invention preferably is injection molded to have a single piece monolithic plastic structure. The utensil may be molded from any of a variety of plastic materials as appropriate to its intended final use. For example, a polyethylene or Teflon material might be preferred if the utensil is to be used in the kitchen because of the durability of these materials and their tendency not to break and not to leach polymers or chemicals into food. Other materials such as PVC or ABS plastic also may be appropriate, particularly if the utensil is not to be used in the kitchen where it will contact food.

Although injection molding is the preferred fabrication method, the utensil may be fabricated by other techniques such as by being formed from individual component pieces. For example, the utensil may be formed with a separate metal blade fitted into plastic side walls and a handle where the intended use requires rugged construction and durability. Thus, while a unitary molded plastic construction is preferred, it certainly is not required and should not be considered to be a limitation of the invention.

The invention has been described primarily in terms of its use as a kitchen utensil for scooping up chopped-up veggies and other food. However the basic utensil of the invention clearly has a wide variety of other uses and applications, all of which are within the scope of the invention. For example, the utensil makes a handy garden tool for digging and tilling in a small garden where the use of a full size shovel is cumbersome. As a multi-purpose tool in the backpack of a hiker, the utensil of this invention can be used on the trail for digging, scraping, chopping food, cooking, and a variety of other chores while taking up a fraction of the space of a traditional backpacker's shovel. As a multi-purpose tool for a home shop or light industrial application, the utensil can be used in a multitude of ways, including the collection of spilled construction materials, transporting loose parts from one location to another, and scooping granular materials out of their containers for transporting and mixing batches of these materials in the utensil or in other containers. A ruggedized and camouflaged version of the utensil may even be useful as standard issue in a military backpack. Thus, the invention disclosed herein is not and should not be considered to be limited to the particulars of its preferred embodiment as a kitchen utensil. These and other additions, deletions, and modifications might well be made to the preferred embodiment of the invention illustrated herein without departing from the spirit and scope of the invention as set forth in the claims.

What is claimed is:

1. A scooping utensil comprising:

a pan having a floor with a forward edge, a left side wall extending upwardly along a left side of the floor, and a right side wall extending upwardly along a right side of the floor; and a handle portion formed along a rear side of said pan, said handle portion extending between said upstanding walls and being ergonomically shaped to fit comfortably in the hand of a user;

said upstanding walls and said handle portion bounding three sides of said pan to restrain scooped-up items against spilling out of said pan;

said handle portion being generally oval in cross section and arched rearwardly relative to said pan.

2. A hand utensil comprising a pan having a floor with a relatively thin forward edge, an upstanding right side wall bounding one side of said pan, an upstanding left side wall bounding the opposite side of said pan, and a contoured handle portion extending between said right and left side walls and bounding a rear of said pan, said contoured handle being generally oval in cross-section and curved rearwardly relative to said pan.

3. A hand utensil as claimed in claim 2 and wherein said contoured handle is generally tubular with a passageway extending therethrough.

4. A hand utensil as claimed in claim 3 and wherein said left and said right side walls have top edges that are curved from a thin forward point adjacent said forward edge of said floor to a wider rear section at said handle portion.

5. A hand utensil as claimed in claim 4 and wherein said left and said right side walls merge into said handle portion at the rear of said pan.

6. A method of handling chopped food in a kitchen, said method comprising the steps of:

(a) arranging the chopped food in a mound;

(b) scooping the mound of chopped food into the pan of a scooping utensil having side walls that bound opposite sides of the pan and a handle portion that bounds the rear of the pan;

(c) carrying the mound of food in the pan to a location of use; and (d) dumping the mound of food at the location of use;

the handle portion of the scooping utensil being contoured to fit comfortably in a hand for holding and manipulating the utensil and being generally oval in cross-section.

7. The method of claim 6 and where in step (b) the handle portion curves outwardly relatively to pan.

* * * * *